United States Patent [19]

Perry

[11] 3,826,930

[45] July 30, 1974

[54] FAIL-SAFE OPTICALLY COUPLED LOGIC NETWORKS

[75] Inventor: Robert H. Perry, Irwin, Pa.

[73] Assignee: Westinghouse Electric Corporation, Pittsburgh, Pa.

[22] Filed: June 5, 1973

[21] Appl. No.: 367,255

[52] U.S. Cl. .................. 307/311, 307/203, 307/218

[51] Int. Cl. .................. H03k 3/42

[58] Field of Search .................. 307/218, 311, 203; 250/522, 523

[56] References Cited

UNITED STATES PATENTS

| | | | |
|---|---|---|---|
| 2,995,664 | 8/1961 | Deuitch | 307/218 |
| 3,231,758 | 1/1966 | Diamant | 307/218 |
| 3,321,631 | 5/1967 | Biard et al. | 307/311 X |
| 3,430,066 | 2/1969 | Marsh et al. | 307/218 |
| 3,486,029 | 12/1969 | Barrett et al. | 250/552 |

*Primary Examiner*—Rudolph V. Rolinec
*Assistant Examiner*—B. P. Davis
*Attorney, Agent, or Firm*—J. M. Arnold

[57] ABSTRACT

A plurality of fail-safe optically coupled logic networks are disclosed which perform the AND, OR, latching, and signal transfer function.

4 Claims, 4 Drawing Figures

FAIL-SAFE OPTICALLY COUPLED LOGIC NETWORKS

CROSS REFERENCE TO RELATED APPLICATIONS

Reference is made to the following issued United States patents: "Electronic Latch Circuit" U.S. Pat. No. 3,751,689, filed July 22, 1971 on behalf of William P. Hogg. "Transfer Gate" U.S. Pat. No. 3,748,497 filed Sept. 3, 1971 on behalf of David H. Woods. "FailSafe Logic Gates," U.S. Pat. No. 3,600,604 filed Dec. 3, 1968 on behalf of George M. Thorne-Booth. The above named United States patents are assigned to the assignee of the present invention.

BACKGROUND OF THE INVENTION

Recent vehicle control systems utilize fail-safe electronic logic components to perform the functions that were formerly performed by vital relays as used in vehicle control systems. These fail-safe electronic logic components have utilized capacitor and/or transformer coupling. When such components are used, the use of high operating voltages may be necessitated which in turn requires a more careful transistor selection. Higher operational frequencies may also be necessitated which in turn may introduce noise problems.

According to the teachings of the present invention, fail-safe logic networks are disclosed which utilize optical coupling which results in a logic network which is relatively inexpensive, operates at low frequencies, operates at lower voltages, and which does not exhibit certain failure modes found in the prior art.

SUMMARY OF THE INVENTION

According to the teachings of the present invention, fail-safe optically coupled logic networks are disclosed which include a switch which is normally in an open condition, and which is closed in response to the provision thereto of a first signal. A light emitting device is connected in series with the switch, which device emits light in response to the application of a second signal thereto, concurrent with the switch being closed. Light responsive means are included which provide an output signal in response to the light emitting device emitting light. Other switches and light emitting devices may be included for performing a plurality of logic functions.

DESCRIPTION OF THE PREFERRED EMBODIMENT

Figure 1:
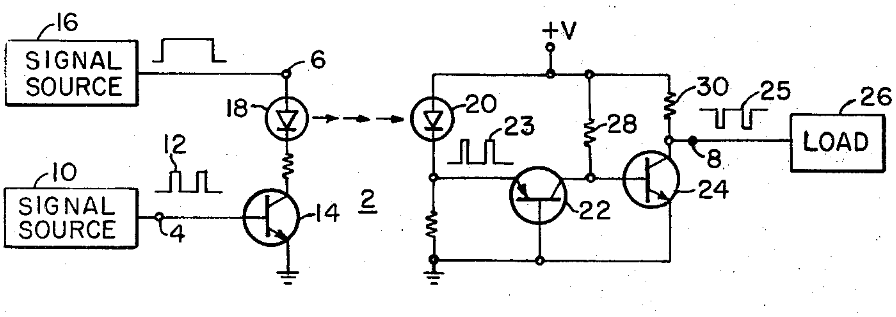
FIG. 1 is a schematic diagram representation of a fail-safe optically coupled AND gate.

In FIG. 1, there is illustrated a fail-safe optically coupled AND gate 2 having signal input terminals 4 and 6 and a signal output terminal 8. A periodic signal is provided at the output terminal 8 only in response to a periodic signal being applied to the input terminal 4 concurrent with a gating signal being applied to the input terminal 6. A signal source 10 such as a speed encoding device or the like provides a periodic signal such as the signal 12 to the base electrode of a NPN transistor 14. The transistor 14 becomes conductive in response to the positive pulses of the signal 12 only when the signal source 16 provides a positive gating signal to the anode electrode of a light emitting device such as the light emitting diode 18. The light emitting diode 18 emits light in response to the concurrent provision of the positive gating signal to the input terminal 6 concurrent with the transistor 14 being made conductive by the positive input pulses being applied to the input terminal 4. A light responsive means such as the photodiode 20 responds to the light from the diode 18 and provides current to the emitter electrode of a transistor 22 which is connected in the grounded base configuration. It is to be appreciated that other light responsive means such as a phototransistor or the like may be used in place of the photodiode 20. The transistor 22 provides current pulses 23 to the base electrode of a transistor 24 which becomes conductive in response thereto and provides negative going pulses 25 at the output terminal 8 which pulses occur substantially at the same time as the positive going pulses of the signal 12 which are applied to the input terminal 4. A load device 26 is responsive to the signal appearing at the output terminal 8, and for example, may take the form of a signal decoder or the like. The resistor 28 functions as a base bias resistor for the transistor 24 and the resistor 30 functions as a load resistor. The positive potential applied to the base electrode of the transistor 24 by way of the resistor 28, in the absence of the photodiode 20 sensing light, biases the transistor 24 in a nonconductive condition, and positive potential is sensed at the output terminal 8 by way of the resistor 30. The signal at the output terminal 8 is driven essentially to a ground potential each time the transistor 22 becomes conductive thereby applying current to the base electrode of the transistor 24 in response to the photodiode 22 sensing light.

It is seen that the AND gate 2 is truly fail-safe since in the absence of signal output from either the source 10 or 16 the light-emitting diode 18 ceases to emit light. Likewise, if there is a break in connection at either of the two input terminals the device ceases to emit light. If the transistor 14 were to open clearly there would be no current path through the light emitting diode and light could not be emitted and, on the other hand, if the transistor 14 were to short the light-emitting diode 10 would emit a constant level of light rather than at a periodic rate. Alternatively, the diode 18 may burn out due to the heavy current drawn by the shorted transistor 14. For the AND gate 2 shown there is no possibility of signal feedback from the output to either of the input terminals, as is possible when transformer or capacitive coupling is used, since the photodiode 20 does not emit light, and the light emitting diode is not responsive to the emission of light. The failure of any circuit component in the portion of the circuit connected to the output terminal 8 cannot result in the provision of a periodic output signal, in the absence of a periodic signal input, since there are no reactive components included therein. The only failure condition possible is that a +V signal is constantly provided at the output terminal 8, which is a safe condition, since this is what normally occurs in the absence of a periodic input signal, or alternatively a ground or zero volt potential is continuously provided at the output terminal 8. This is also a safe condition, since the load device 26 is designed to respond only to a periodic input signal.

Figure 2:
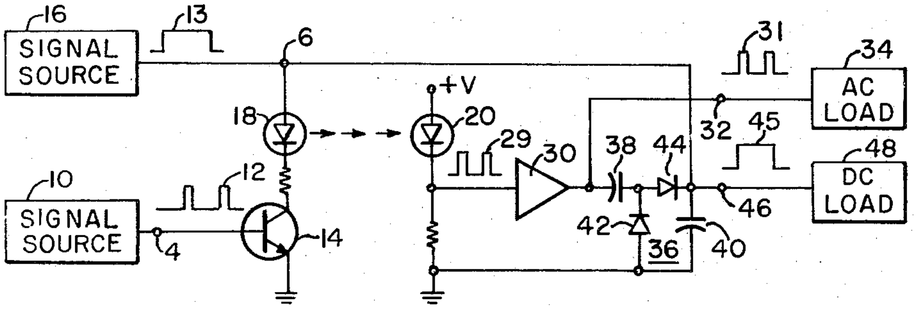
FIG. 2 is a schematic diagram of a fail-safe optically coupled latching network.

FIG. 2 illustrates a fail-safe latching device, which is essentially the previously described AND gate including a feedback network, such that the latching device continues to provide a periodic signal at its output terminal as long as a periodic signal is continuously provided to one input terminal concurrent with and subsequent to the momentary provision of a gating signal to the other input terminal. Components in FIG. 2 which are similar to components in FIG. 1 are given the same numerical designation. The signal source 10 provides the periodic signal 12 to the input terminal 4 which is connected to the base electrode of the transistor 14. The signal source 16 provides, for a short duration, a gating signal 13 to the input terminal 6, which is connected to the anode electrode of the light emitting diode 20. In response thereto, the light emitting diode emits light, and the photodiode 20 responds to the emitted light and provides pulses of current 29, as shown, to the input of an amplifier 30, which in turn provides a periodic signal 31 at an output terminal 32 which is connected to an A.C. load device 34 which, for example, may be a signal decoder or the like. The periodic signal provided at the output of the amplifier 30 is also provided to a detector device 36 which includes capacitors 38 and 40 as well as diodes 42 and 44. A positive DC signal 45 is provided at an output terminal 46, which is connected to a DC load device 48, which for example may take the form of a relay or the like. This DC signal is also coupled to the input terminal 6 for maintaining the photodiode 18 conductive as long as a periodic signal is continuously provided to the input terminal 4. It is seen therefore that once the photodiode 18 emits light in response to the concurrent provision of a periodic signal at the input terminal 4 and a gating signal at the input terminal 6 from the signal source 16, the photodiode will continue to emit light due to the continuous periodic signal input at the terminal 4 and the signal feedback at the input terminal 6 from the output of the detector stage 36. The latching device illustrated functions in a fail-safe manner for reasons similar to those given for the fail-safe operation of the AND gate 2 illustrated in FIG. 1.

Figure 3:
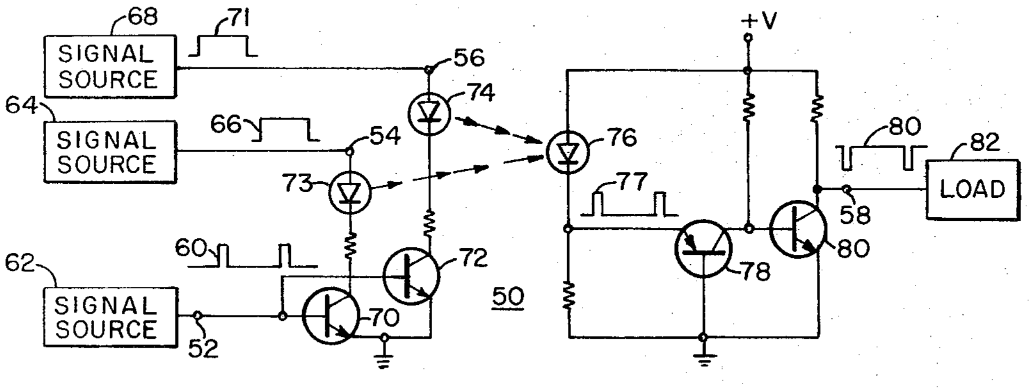
FIG. 3 is a schematic diagram representation of a fail-safe optically coupled OR gate.

Refer now to FIG. 3 which illustrates a fail-safe optically coupled OR gate. An OR gate 50 includes signal input terminals 52, 54 and 56 and a signal output terminal 58. The signal input terminal 52 has a periodic signal 60 applied thereto from a signal source 62 which, for example, may be a speed encoding device or the like. A signal source 64 applies a gating signal 66 to the input terminal 54, and a signal source 68 provides a gating signal 71 to the signal input terminal 56. The periodic input signal 60 is applied concurrently to the base electrodes of transistors 70 and 72, respectively. If a gating signal is applied to the input terminal 54, concurrent with the periodic signal 60 being applied to the base electrode of the transistor 70, the light-emitting diode 73 emits light at the same frequency as the periodic signal 60, whereas if a gating signal 71 is applied to the input terminal 56, concurrent with the periodic signal 60 being applied to the base electrode of the transistor 72 a light-emitting diode 74 emits light at the same frequency as the periodic signal 60. In response to the emission of light by the light-emitting diodes 73 or 74, the photodiode 76 becomes conductive and provides pulses of current 77 to the emitter electrode of a transistor 78 which is connected in the grounded base configuration. A transistor 80 becomes conductive in response to pulses of current applied to its base electrode from the conducting transistor 78 and in response thereto provides an output signal 80 at the output terminal 58. The periodic output signal 80 is applied to a load device 82 which may take the form of a decoder or the like. The OR gate 50 operates in a fail-safe manner for reasons similar to those given for the fail-safe operation of the AND gate 2, and further there is no possibility of signal feedback from terminal 54 to 56 or vice versa due to the characteristic of the light emitting diode not being responsive to the emission of light as was previously mentioned.

Figure 4:
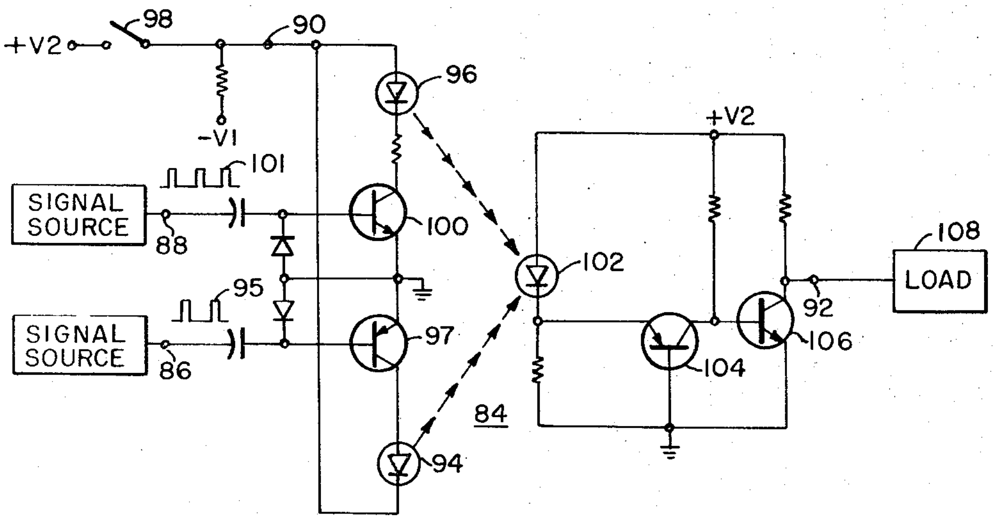
FIG. 4 is a schematic diagram representation of a fail-safe optically coupled signal transfer network.

Refer now to FIG. 4 which illustrates a fail-safe optically coupled signal transfer gate according to the teachings of the present invention. The signal transfer gate performs the function of a single pole double-throw relay. The transfer gate 84 includes signal input terminals 86, 88 and 90 and a signal output terminal 92. The signal input terminals 86 and 88 have message information signals applied thereto for example, speed coded signals. The signal input terminal 86 normally receives a low speed command, for example a zero speed command, whereas the signal input terminal 88 receives a higher speed command such as 50 miles per hour or more. The −V1 signal which is normally provided to the signal input terminal 90 is of the sense to render the light emitting diode 94 conductive, whereas a positive voltage is needed to render the light-emitting diode 96 conductive. A positive signal is applied to the input terminal 90 only in response to the switch 98 being closed such that the positive voltage +V2 is applied thereto. It is to be appreciated that the positive voltage +V2 is equal to or greater in magnitude that the negative voltage −V1. Consider the case in which the switch 98 is in the open condition as illustrated. The voltage −V1 therefore is applied to the signal input terminal 92 reverse biasing the light-emitting diode 96 and biasing the light-emitting diode 94 to a conductive condition. In response to a periodic signal input 95 to the input terminal 86, the PNP transistor 97 becomes conductive and the light-emitting diode 94 emits light at a frequency determined by the frequency of the signal appearing at the input terminal 86. The NPN transistor 100 remains non-conductive even though there may be periodic signals applied to the input terminal 88, since the lightemitting diode 96 is reverse biased due to the negative signal potential applied to the input terminal 90.

Consider now the case in which the switch 98 is closed and the positive potential +V2 is applied to the input terminal 90. In this instance, the photodiode 94 is reverse biased and the photodiode 96 is biased to a conductive condition. In response to a periodic signal input 101 to the terminal 88 the transistor 100 becomes conductive and the photodiode 96 emits light at a frequency determined by the frequency of the signal 101 appearing at the input terminal 88. The transistor 97 remains non-conductive at this time, irrespective of periodic signals being applied to the input terminal 86, since the light-emitting diode 94 is reverse biased due to the positive potential at the terminal 90. A photodiode 102 responds to the emission of light from either the light-emitting diode 94 or 96 and provides current pulses to the emitter electrode of a transistor 104 which is connected in the grounded base configuration. A transistor 106 responds to the conduction of the transistor 104 to in turn become conductive, providing a periodic signal output at the output terminal 92. This output signal occurs at a frequency dependent upon the frequency of the light sensed by the photodiode 102. A load device 108, which may take the form of a decoder or the like, responds to the periodic signals appearing at the output terminal 92. The signal transfer gate 84 operates in a fail-safe manner for reasons similar to those given for the fail-safe operation of the AND gate 2.

In summary, a plurality of fail-safe optically coupled logic elements have been disclosed which provide a signal output only in response to predetermined signal inputs.

I claim as my invention:

1. A fail-safe optically coupled logic network comprising:

a source of gating signals;

a source of control signals;

a transistor having base, emitter, and collector electrodes, with the base electrode being connected to said source of control signals;

a light-emitting diode having two terminals, with the first being connected to said source of gating signals and the second being connected to one of the emitter and collector electrodes of said transistor, said light-emitting diode emitting light in response to the provision of a gating signal to the first terminal thereof concurrent with a control signal being applied to the base electrode of said transistor;

means responsive to said light-emitting diode emitting light for providing an output signal; and means responsive to the provision of said output signal for applying a latching signal to the first terminal of said light-emitting diode.

2. A fail-safe optically coupled logic network comprising:

first and second transistors of opposite conductivity each having base, emitter, and collector electrodes, with one of the collector and emitter electrodes of said first transistor being connected to the like electrode of said second transistor;

first and second light-emitting diodes each having anode and cathode electrodes, with the anode electrode of the first being connected to the cathode electrode of the second and the cathode electrode of the first being connected to the remaining one of the collector and emitter electrodes of said first transistor and the anode electrode of the second being connected to the remaining one of the collector and emitter electrodes of said second transistor;

first and second signal input means for applying first and second signals to the base electrodes of said first and second transistors, respectively, for rendering them conductive;

means for selectively applying a third signal of one of two values to the common connection of said first and second light emitting diodes, the first value being of the sense to render said first light-emitting diode conductive and said second light-emitting diode nonconductive, and the second value being of the sense to render said first light-emitting diode nonconductive and said second light-emitting diode conductive, said first light-emitting diode emitting light in response to the third signal being of the first value concurrent with said first transistor being conductive, and said second light-emitting diode emitting light in response to the third signal being of the second value concurrent with said second transistor being conductive; and light responsive means for providing an output signal in response to one of said first and second light emitting diodes emitting light.

3. A fail-safe optically coupled logic network comprising:

first and second switches each having a conduction path and a control terminal to which control signals are applied for closing said switches, with said switches having their respective conduction paths connected in series;

first and second light-emitting diodes each having anode and cathode electrodes, with the anode electrode of the first being connected to the cathode electrode of the second and the cathode electrode of the first being connected to the conduction path of said first switch and the anode electrode of the second being connected to the conduction path of said second switch;

first and second control signal input means for applying first and second control signals to the control terminals of said first and second switches, respectively, for closing same;

means for selectively applying a third signal of one of two values to the common connection of said first and second light emitting diodes, the first value being of the sense to render said first light-emitting diode conductive and said second light emitting-diode nonconductive, and the second value being of the sense to render said first light-emitting diode nonconductive and said second light-emitting diode conductive, said first light-emitting diode emitting light in response to the third signal being of the first value concurrent with said first switch being closed, and said second light-emitting diode emitting light in response to the third signal being of the second value concurrent with said second switch being closed; and light responsive means for providing an output signal in response to one of said first and second light-emitting diodes emitting light.

4. A fail-safe optically coupled latching logic network comprising:

a source of gating signals;

a source of control signals;

a switch having a conduction path and a control terminal to which said control signals are applied for closing said switch;

a light-emitting diode having two terminals, with the first being connected to said source of gating signals and the second being connected to the conduction path of said switch, said light-emitting diode emitting light in response to the provision of a gating signal to the first terminal of said light emitting diode concurrent with said switch being closed;

means responsive to said light-emitting diode emitting light for providing an output signal; and means responsive to the provision of said output signal for applying same to the first terminal of said light-emitting diode for maintaining said light-emitting diode in a light-emitting condition during the time said control signals are concurrently applied to the control terminal of said switch.

* * * * *